Aug. 25, 1970     I. K. MILLER     3,525,735

HIGHLY ABSORBENT CELLULOSE ETHERS

Filed Oct. 27, 1961     6 Sheets-Sheet 1

INVENTORS

IVAN KEITH MILLER

BY Carl A. Hechmer
ATTORNEY

INVENTOR:
IVAN KEITH MILLER
BY Carl A. Hechner
ATTORNEY

Aug. 25, 1970 I. K. MILLER 3,525,735
HIGHLY ABSORBENT CELLULOSE ETHERS
Filed Oct. 27, 1961 6 Sheets-Sheet 4

INVENTORS
IVAN KEITH MILLER
BY Carl A. Hechmer
ATTORNEY

INVENTORS

IVAN KEITH MILLER

BY *Carl A. Hechmer*

ATTORNEY

INVENTORS

IVAN KEITH MILLER

BY *Carl A. Hechner*

ATTORNEY

United States Patent Office 3,525,735
Patented Aug. 25, 1970

3,525,735
HIGHLY ABSORBENT CELLULOSE ETHERS
Ivan Keith Miller, Wilmington, Del., assignor to E. I. du Pont de Nemours and Company, Wilmington, Del., a corporation of Delaware
Continuation-in-part of application Ser. No. 738,846, May 29, 1958. This application Oct. 27, 1961, Ser. No. 148,066
Int. Cl. C08b 11/00
U.S. Cl. 260—231                                   5 Claims

ABSTRACT OF THE DISCLOSURE

The process for preparing a modified viscose which comprises reacting alkali cellulose with an etherifying agent such as reacting alkali cellulose with carbon disulfide and acrylonitrile and dissolving the reacted cellulose in a dilute aqueous solution of alkali hydroxide. The cellulose derivatives, which have high absorbency, are useful as sponges, surgical dressings, disposable diapers, paper towels, filters among many other uses.

---

This application is a continuation-in-part of Ser. No. 738,846, filed May 29, 1958, now abandoned.

This invention relates to a novel and useful cellulose ether and structures formed therefrom. More specifically, it relates to a highly hydrophilic, water-insoluble cellulose ether and to a novel process whereby such a material may be prepared.

STATE OF THE ART

Ether derivatives of cellulose are old in the art. These materials will vary considerably, depending (a) upon the degree of substitution of the etherifying radical upon the cellulose (there are three hydroxyl groups on each recurring unit of the cellulose polymer available for the etherification reaction) and (b) the molecular arrangement of the substituent groups (which is governed in large measure by the etherifying technique). Thus the various types of materials that can be formed by etherifying solubilized cellulose (i.e. solutions of alkali cellulose and cellulose xanthate) are well illustrated with reference to cyano ethylated cellulose by MacGregor et al. in the Journal of the Society of Dyers and Colourists vol. 69 at pages 67–73. In this article it is demonstrated that such materials progress from a water-insoluble-alkali-soluble ether (at a degree of substitution of 0.2 to 0.3) to a completely water-soluble ether (at a degree of substitution of 0.7 to 1.0) and thereafter to a second water-insoluble-alkali-soluble product that is also soluble in acetone-water mixtures at a degree of substitution of 2. Since these products are formed from a homogeneous, liquid phase reaction mixture, it is obvious that the distribution of substituted groups will be random in nature. A mathematical treatment of molecular arrangements arising from such reaction is presented in the Journal of Polymer Science 36, 313–23 (1959) by L. F. Beste. In the same MacGregor et al. article, a highly substituted product is described which is formed by reacting after swelling in sodium hydroxide either of the two previously described lower substituted structures or regenerated cellulose wtih acrylonitrile to provide a degree of substitution of from 2.5 to 3.0. This shaped product is soluble in such solvents as acetone, acrylonitrile, dimethyl formamide, methyl formate and β-ethoxy propionitrile. Such materials from viscose rayon are also described in MacGregor et al., U.S. Pat. 2,522,-627. Obviously in this reaction cyanoethylation is largely localized at the surface of the shaped structure, thereby producing a highly heterogeneous product, even at a microscopic level, the more remote portions of the shaped structure being unaffected by the surface treatment. Such heterogeneous materials at an over-all degree of substitution of 0.5 are highly water-resistant and hydrophobic.

Another etherification process of the prior art is the direct etherification of solid alkali cellulose using ethylene oxide to produce a water-insoluble, alkali-soluble composition. Such a technique is described in U.S. Pat. 1,914,172, dated June 13, 1933 to Schorger. While the compositions which may be formed by the process vary widely, particularly depending upon the amount of caustic in the alkali cellulose and the proportion of ethylene oxide added, this art is concerned with production of a water-insensitive, rayon substitute from alkaline solutions, leading away from the water-sensitive product of the present invention.

The product of the present invention is a microscopically uniform etherified cellulose having a degree of substitution of from about 0.2 to about 0.7 with unique solubility and water absorbency characteristics indicating a novel molecular structure as is borne out by evidence presented hereinafter. The product of the present invention cannot be made by the etherification of a solubilized xanthate or by etherification of the shaped cellulose structure.

OBJECTS

It is an object of this invention to provide a novel and useful cellulose ether.

A specific object is to provide a cellulose ether which is water-insoluble but capable of absorbing large quantities of water.

Another object is to provide a fibrous structure of the cellulose ether which is readily water-dispersible and capable of bonding conventional fibrous materials to form strong sheet materials.

A still further object is to provide a process for the preparation of water-insoluble but highly water-sensitive cellulose ether compositions.

These and other objects will become apparent in the course of the following specification and claims.

ILLUSTRATIONS

The invention will be more readily understood by reference to the illustrations.

FIGS. 1 to 5 inclusive are curves depicting characteristic nuclear magnetic resonance derivative spectra wherein the derivative output signal in millivolts as ordinate is plotted against field strength in gauss as asbscissa. These curves, referred to more specifically in Example 5 and in the statement of invention are obtained by conventional techniques upon a Varian Dual-Purpose nuclear magnetic resonance spectrometer, Model No. V4302 (manufactured by Varian Corporation of California) using a radio frequency field of 54.6 megacycles per second, an attenuation of 18 decibels, a sweep amplitude of 1 gauss, a scan rate of 5.7 gauss per minute and a probe insert of 5 millimeters. The variation in field strength is calibrated by means of the audiomodulated nuclear magnetic resonance of water. FIGS. 1, 3 and 4 are characteristic curves respectively of (a) the product of the present invention, (b) cyanoethylated cotton and (c) cotton, each vacuum dried for 16 hours at 150° C. FIG. 2 is the characteristic curve of (a) above after immersion of the sample in deuterium oxide while FIG. 5 is the curve resulting after immersion of the sample of (b) in deuterium oxide. FIGS. 6 and 7 are curves plotting the percent of sample as ordinate vs. the number of adjacent repeating units having no ether substituents as abscissa in hypothetical situations represents (1) the product of the present invention (curve *e*), (2) cyanoethylated dissolved xanthate (curve *f*) and (3) cyanoethylated cotton (curve *g*). FIG. 7 is plotted on a log scale for convenience in presenting a wide range of units along the abscissa.

FIGS. 11 to 17 inclusive are phase contrast photomicrographs at a magnification of about 100 times representative portions of the sheet-forming particle of the present invention referred to more particularly in Example 5.

Figure 18:
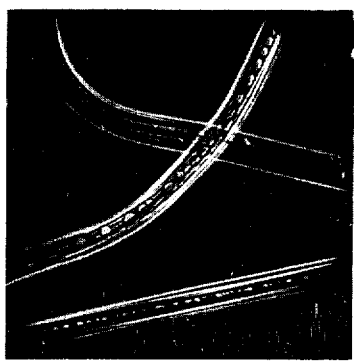

FIG. 18 is a phase contrast photomicrograph at a magnification of about 100 times of extruded filaments of Example 10.

Figure 19:
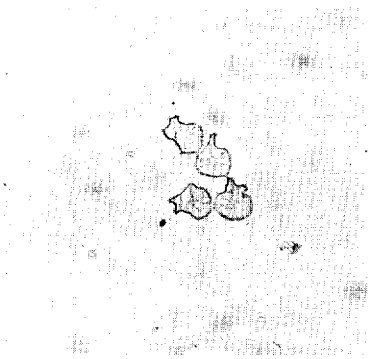
Figure 20:

FIGS. 19–20 are phase contrast photomicrographs of the cross sections at a magnification of about 125 times of continuous filaments produced as described in Examples 10 and 11 respectively.

Figure 21:
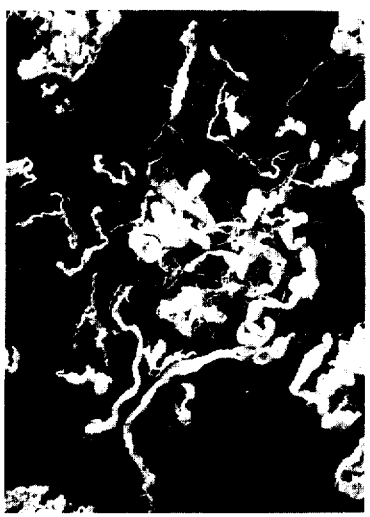
Figure 22:
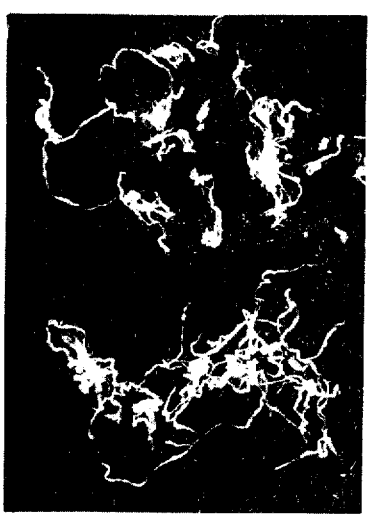
Figure 23:

FIGS. 21–23 are conventional photomicrographs further illustrating typical morphology of the precipitated products of the present invention, FIG. 21 showing products produced by Example I, whereas FIG. 22 shows the products of Example II.

Figure 24:
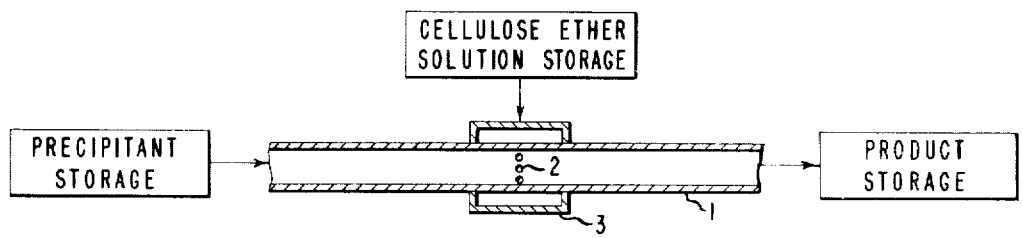

FIG. 24 is a diagrammatic representation of the apparatus used in Example III. In the figure, precipitant, fed through one end of tube 1, is mixed with cellulose ether solution at holes 2 which are fed by manifold 3. The product is recovered at the end of tube 1 opposite to that to which precipitant is fed.

STATEMENT OF INVENTION

Cellulose ether

The cellulose ether of the present invention is a hydrophylic, water-insoluble, microscopically uniform material characterized by a high degree of water absorbency, the said material having a degree of ether substitution upon partially substituted cellulose polymer chains of from about 0.1 to about 0.7 in a substantially non-crystalline but well ordered structure having a high level of chain segment mobility. By the expression "microscopically uniform" is meant that no variation in the empirical formula is detectable upon ultimate analysis of particles as small as one micron.

By a "high degree of water absorbency" is meant that a shaped structure of the cellulose ether of the present invention will absorb water (by a technique to be described more completely hereinafter), to the extent of at least about 7 grams of water per gram of cellulose ether.

By the expression "partially substituted cellulose polymer chains" is meant that the repeating units in the cellulose polymeric chain are not completely substituted by ether groups, the distribution of ether linkages being neither completely random as discussed above under "State of the Art" nor sufficiently heterogeneous to provide microscopic non-uniformity. While applicants do not wish to be bound by any particular theory, it is believed that the products of this invention combine a major portion of chain segments which have random distribution, and a minor portion which have a short-range maximum of unsubstituted groups representing remnants of crystalline regions. If the major random substituted portion represents A% of the total, and the remainder consists of short-chain unsubstituted cellulose chain segments, then the degree of substitution (D.S.) in the random portion is $$D.S. = \frac{100 \times D.S.(\text{total})}{A}$$

(100−A)% of the material is unsubstituted cellulose distributed around an average block length $i_0$ according to the well-known distribution formula:

$$Yi = \frac{e^{-r}}{S\sqrt{2\pi}}$$

where:

$$r = \frac{(i-i_0)^2}{2S^2}$$

S = normalizing constant, to give unit area under the distribution curve

Yi = fraction of the sample which consists of chains exactly $i$ unsubstituted rings in length By this analysis, it is apparent that the degree of substitution in the random areas is greater than the average degree of substitution. The cellulose ethers of this invention are composed of random-substituted material to the extent of at least about 50% but not over 90%. Accordingly, the degree of substitution in these randomsubstituted areas is at least 0.22 and may not exceed 1.4.

Figure 6:
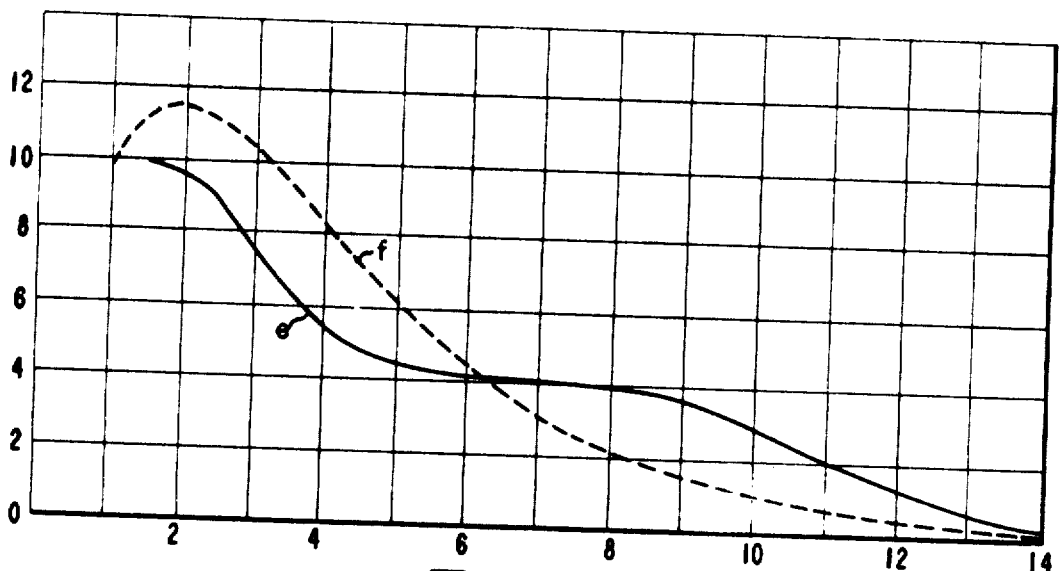
Figure 7:
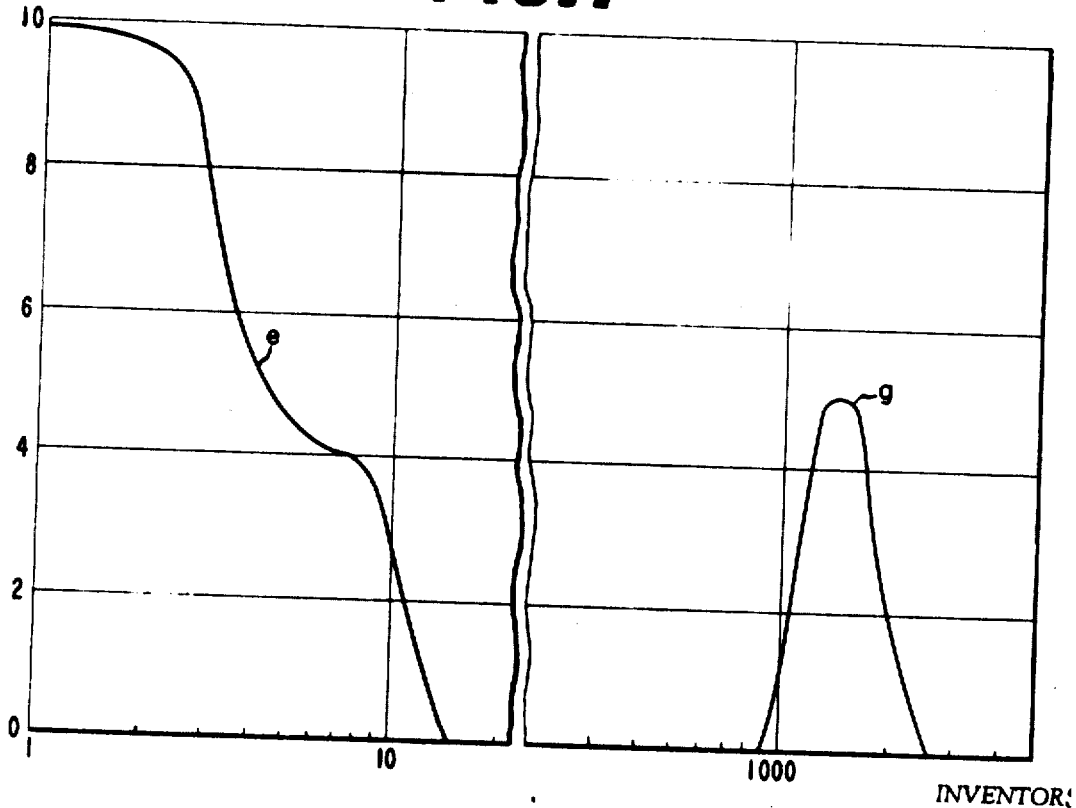

An illustrative comparison of different types of distribution is given in FIG. 6. This graph plots the distribution of unsubstituted chain segments of any particular number of rings as abscissa versus the weight percent of the total material composed of such segments as ordinate. A randomly substituted structure (curve $f$) and a typical ether of this invention (curve $e$) for the same degree of substitution are presented in FIG. 6. FIG. 7 is a similar comparision of cyanoethylated cotton (curve $g$) and a product of the present invention (curve $e$) on a logarithmic horizontal scale to permit illustration of the two curves on the same scale.

Figure 8:
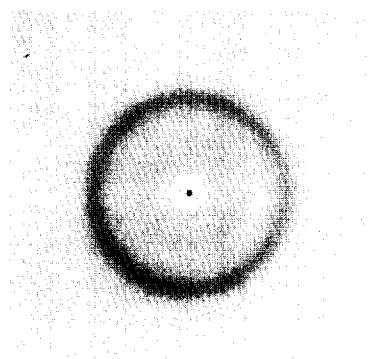
FIG. 8 is an X-ray diffraction pattern of the product of the present invention as referred to in Example 5.
Figure 9:
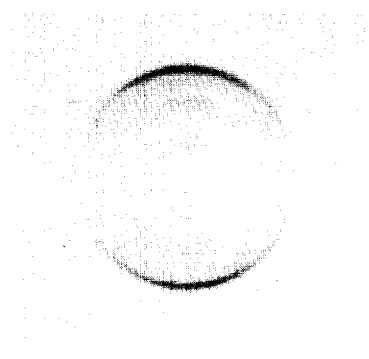
FIG. 9 is an X-ray diffraction pattern of cyanoethylated cotton referred to in Example 5.
Figure 11:
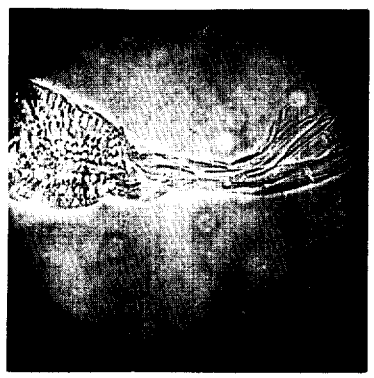
Figure 10:
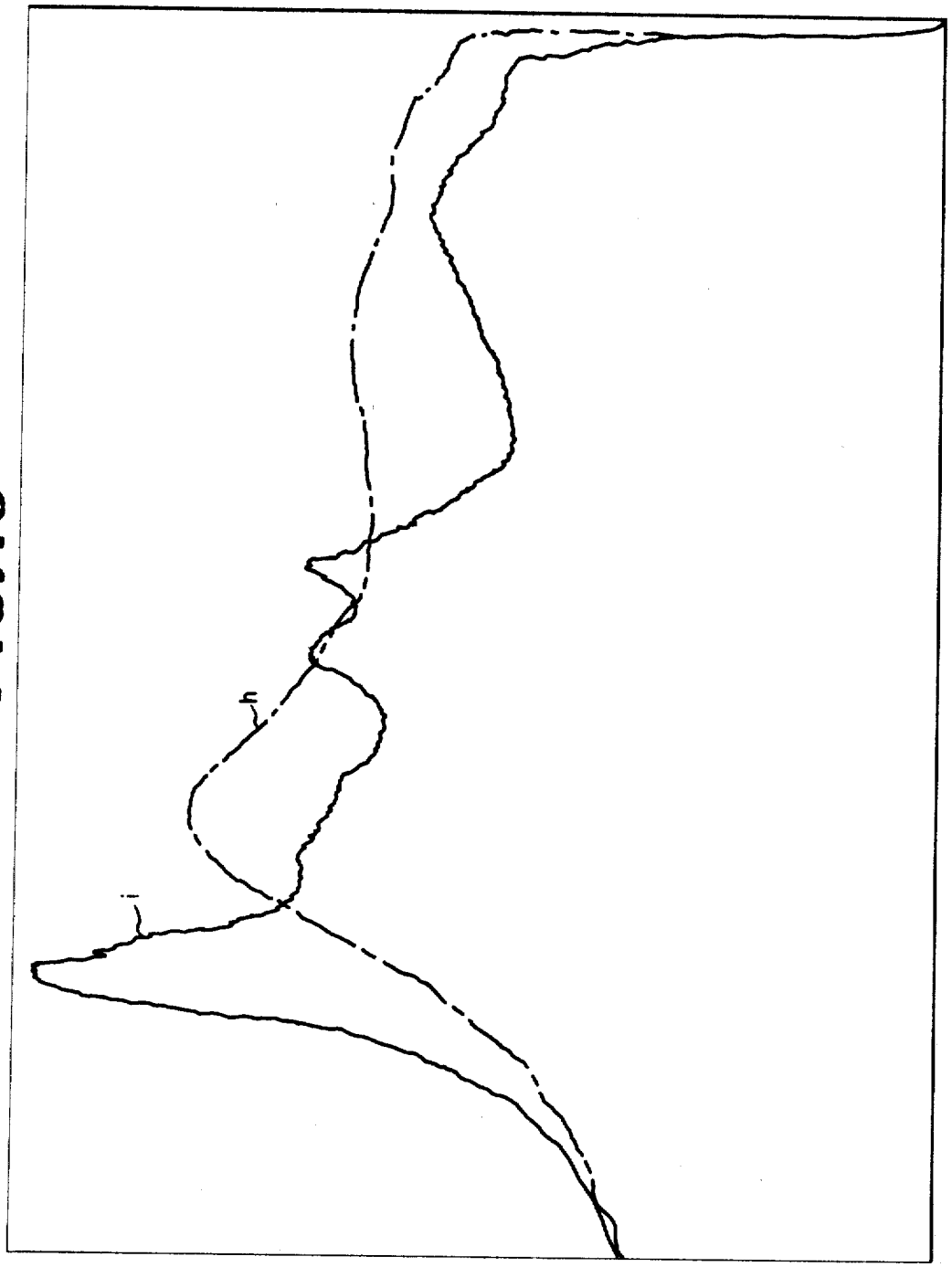
FIG. 10 is a photometer tracing of the X-ray diffraction patterns of FIGS. 8 and 9, curve $h$ being the curve of the pattern of FIG. 8 and curve $i$ being the trace of the pattern of FIG. 9.
Figure 15:
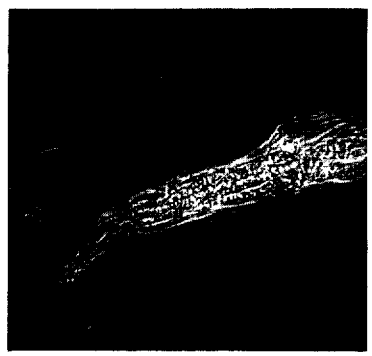
Figure 16:
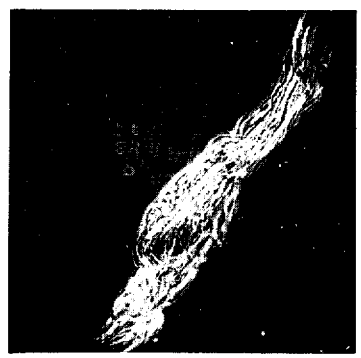

By "non-crystalline but well ordered structures" is meant that the product as formed possesses a high level of amorphous ordering in the solid form, i.e. there is no regularity of distances between similarly and dissimilarly substituted units. This structural information is obtained by conventional X-ray diffraction studies of products in equilibrium with the liquid state. In such studies, crystallinity appears as sharp, narrow bands or spots in the diffraction pattern, while amorphous material is revealed by broad, diffuse bands. Amorphous ordering is indicated by broad bands which have relatively sharp borders. Minor or trace portions of crystallinity can be detected by X-ray counting goniometer techniques, if desired. Actual X-ray diffraction patterns may be supplemented, and analysis made easier, by photometer traces of the X-ray negatives. Such traces show optical density (vertical axis) as it varies across the radial trace of the pattern. A photometer trace shows a crystalline pattern as a series of abrupt, steep-sided narrow peaks. An amorphous pattern appears as a broad single peak. Amorphous ordering is shown by relatively steep slopes on one or both sides of the broad amorphous peak. This is illustrated in FIGS. 8, 9 and 10. FIG. 8 is an X-ray diffraction pattern of a product of the present invention as identified more fully hereinafter while FIG. 9 is an X-ray diffraction pattern of cyanoethylated cellulose (each substituted to a degree of substitution of 0.5). FIG. 10 is the photometer traces of the negatives of each of these patterns, curve $h$ corresponding to the pattern of FIG. 8 (present invention) and curve $i$ corresponding to the pattern of FIG. 9 (prior art). Since it is possible to convert the products of the present invention to a higher level of order by conventional techniques, evidence of a minor amount of elements of crystalline order is not inconsistent with the products of the present invention.

Figure 1:
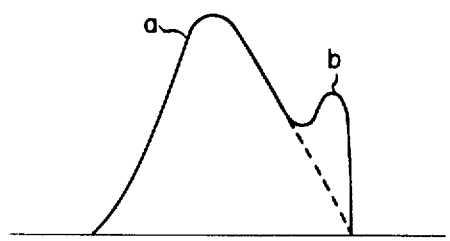
Figure 3:
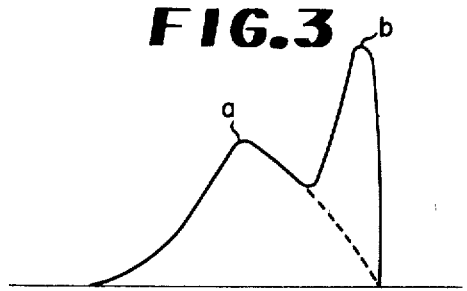
Figure 4:
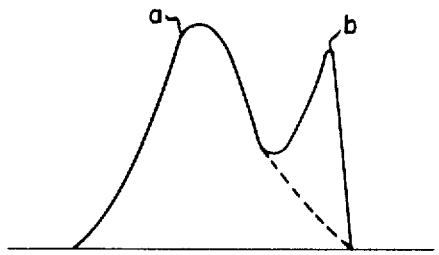

By a "high level of chain segment mobility" is meant that any sample of the cellulose ether of the present invention possesses at least about 50% of fluid-like characteristics when its deuterium oxide immersed form is subjected to nuclear magnetic resonance spectrometric examination. Such high mobility of the component parts of the polymer structure is not in general characteristic of highly ordered cellulosic compositions, and is a significant indication of the novel nature of these products. As will be apparent to those skilled in the art, chain segment mobility is measured by Broad-line Nuclear Magnetic Resonance (NMR) methods. Broad-line NMR detects interchain and other degrees of freedom of polymer segments in the overall matrix which constitutes their environment. This is in contrast to high-resolution NMR, which detects intrachain forces affecting proton energy absorption. Thus the derivative spectral curves are shown in FIGS. 1, 3 and 4 for three materials—the cyanoethyl cellulose material similar to that of Example V (FIG. 1), cotton (FIG. 4) and cyanoethylated cotton (FIG. 3)—each after having been dried 16 hours at 150°. In these curves the rigid portion of the molecular structure is indicated by the half-width of the broad peak segment of the curve $a$, whereas the more fluid component is indicated by the area under the peak sections of the curve $b$.

Figure 2:
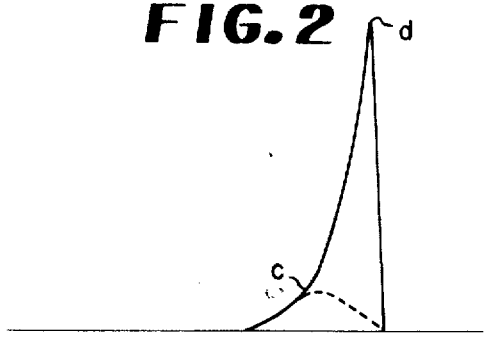

Comparing the curves in FIGS. 1, 3 and 4, it is obvious that the dried cotton (FIG. 4) has the most rigid component (half-width of 12.3 gauss), and that the separation of the two peaks is greatest. The cyanoethylated cotton (FIG. 3) has a narrower peak for the rigid component (half-width of 10.4 gauss). The novel cyanoethylcellulose of this invention has a dry spectrum (FIG. 1) similar to the other two samples with an intermediate half-width of the broad curve (11 gauss) defining the more rigid components. The definitive characteristic curve appears when the samples are immersed in deuterium oxide. As shown in FIG. 2, the cellulose ethers of this invention, when immersed in deuterium oxide give a NMR spectrum characterized by a fused double peak (the remnant of a broad peak $c$ being ascribed to rigid, restrained structural elements) and a narrow peak $d$ (ascribed to fluid-like elements) in which the fluid-like component peak contributes over 50% of the total area under the derivative spectral curve, and with a peak half-width of less than 0.5 gauss.

Figure 5:
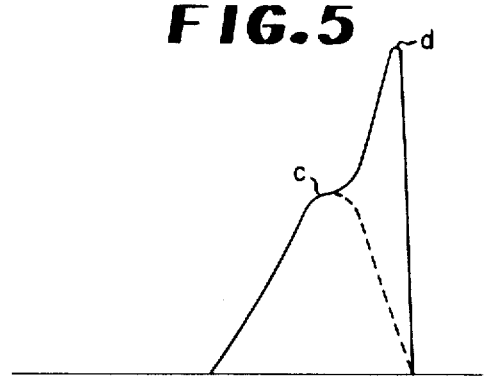

FIG. 5 illustrates the change in the nuclear magnetic resonance curve which occurs when the cyanoethylated cotton (of FIG. 3) is immersed in deuterium oxide. There is obviously very little change of broad peak $c$ and the narrow peak $d$ (from FIG. 5) versus broad peak $a$ (of FIG. 3) and narrow peak $b$ (FIG. 3). There is no change in the curve for cotton when it is immersed in deuterium oxide over that shown in FIG. 4.

ETHERIFICATION PROCESS

The cellulose ether of the present invention may be made by one of several processes. The cyanoethylated product is most conveniently produced by the addition of acryonitrile and carbon disulfide to the barratt during the conventional xanthation process, sufficient acrylonitrile being added to provide a degree of substitution between about 0.2 and about 0.7. Generally from about 0.5 mole to about 3.0 moles of acryonitrile may be used per mole of anhydroglucose. The purpose of the xanthation is to assist in solubilization of the etherified product, but it is not essential in the production of the cyanoethylated product. Thus alkali cellulose may be cyanoethylated by direct addition of acryonitrile to it as exemplified hereinafter. This embodiment of the claimed product requires a more concentrated caustic to solubilize it, due to the absence of the xanthate groups. In addition to simultaneous xanthation and etherification, the xanthation may occur prior or subsequent to etherification to produce a more readily soluble embodiment.

The production of ethers other than cyanoethylated ethers is done by contacting the alkali cellulose in the solid form with the etherifying agent such as an alkylene oxide or ethylene chlorohydrin. When employing this technique with alkylene oxide as etherifying agent it is essential that the alkali cellulose have a caustic content less than about 30% by weight based on cellulose (and preferably from about 18% to about 22%) and that sufficient of the etherifying agent be added to provide at least about 30% by weight of alkylene oxide based on the weight of the cellulose employed in the reaction. The use of alkali cellulose of a higher caustic concentration and/or the use of a lesser amount of etherifying agent generally favors the production of a water insensitive, rayon type material.

SHAPED STRUCTURES

The cellulose ether of the present invention is useful in the production of novel and useful shaped structures. For instance, it can be extruded into fibers or films which when de-watered have a high water absorbency. In addition, alkali solutions of the ethers of the present invention can be employed in a shear precipitation process as defined more completely hereinafter to produce a sheet-forming particle, or a particle from which a sheet-forming particle can be derived by conventional paper-making beating techniques. Such particles, also, may be de-watered to a high water absorbency form.

The shaped structures of the present invention, whether in the form of de-watered extruded shapes such as fibers (FIG. 18) or films or de-watered particles resulting from shear precipitation (FIGS. 11–17), are characterized by the presence of thin-walled voids as can be seen in the photomicrographs. The voids give the appearance of a cellular structure. This appearance persists in cross-sectional views of extruded fiber (FIGS. 19 and 20) where the voids are arranged in grapefruit section fashion.

Figure 12:
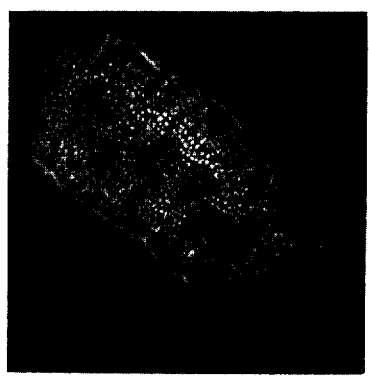
Figure 13:
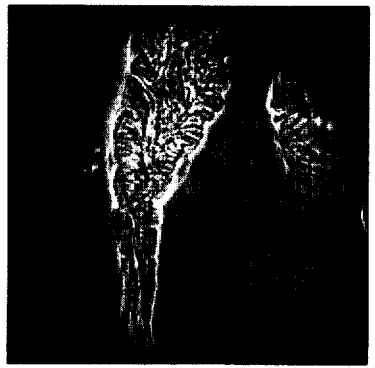
Figure 14:
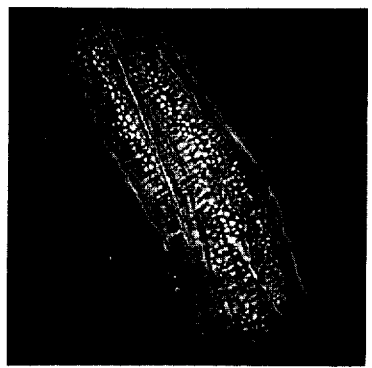
Figure 17:
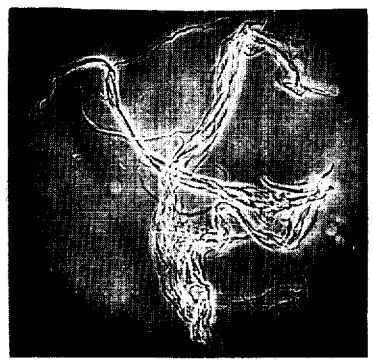

The shape of the precipitated particles can vary widely, even in any given batch of product. Thus, as shown in FIG. 17, some are almost completely of ribbon-like fibrillar morphology, while others include both microcellular sponge-like sections and ribbon-like sections (FIGS. 11, 13, 15 and 16), the microcellular sections appearing as nodular engrossed portions. Other embodiments are essentially completely of the microcellular sponge-like character (FIGS. 12 and 14). The ribbon-like portions have an optical thickness of less than about 0.01 millimeter, the preferred species being not over about 0.001 millimeter in thickness. The voids of the microcellular sections (in both the de-watered precipitated particles and the de-watered extruded shapes) generally have an average cross-diameter of less than about 0.01 millimeter with cell walls of a thickness substantially that of the thickness of the ribbon-like material described above.

For use upon paper-making machines in the manufacture of sheet products it is preferred that the length of the dewatered precipitated particles be between about 8 millimeters and 0.5 millimeter. Particles as long as 20 millimeters may be processed on some equipment however. Particles less than about 0.001 millimeter are generally too fine to be of practical value. As precipitated and de-watered the particles may be in a larger form than that useful for screen deposition. For instance, under some conditions of shear precipitation, the particles are in the form of frazzled strands as long as 10 centimeters composed of a fine structure of interconnected ribbon-like and sponge-like elements. At times these strands may rope up into tangled masses. However, due to the nature of the ribbon and sponge-like elements, these fibrous masses may be refined in conventional paper-pulp processing equipment to give particles of the preferred length for paper-making purposes.

SHAPED STRUCTURE FORMATION

The extruded shaped structures of the present invention are formed by conventional wet spinning techniques of an aqueous caustic solution of the cellulose ether described above, followed by a de-watering operation. Since the product (either as an extruded shape or as shear precipitated particles) is generally formed in aqueous solution, the need for water removal to form a highly absorptive product will be obvious. Since elevated temperature results in formation of a hard, horny product, de-watering is preferably accomplished by displacement (such as with acetone) or osmotically (such as with strong solutions of inorganic salts).

The shear precipitated particles are formed by precipitating the cellulose ether from solution with a combination of shearing conditions and coagulation rate to provide a total shear value ($R'_s$) as defined herein between about 3 and 10,000 and preferably between about 100 and 1600. The preferred products are fibrous.

The dimension "total shear value" ($R'_s$), is defined by the formula:

$$R'_s = \frac{V_p}{V_s} R_p t$$

wherein $V_p$ and $V_s$ are the viscosities of the precipitant and the cellulose ether solution respectively, in poises measured at their respective temperatures just prior to combining to form the precipitant, $t$ is the time in microseconds during which the precipitate is deformable. When precipitation is performed in the presence of a stirring device such as the Waring Blendor, $R_p$ is defined in Formula (a) if the Reynolds number ($R_e$) of the system is no greater than 3350 (i.e., laminar flow) and (b) if the Reyonolds number exceeds 3350 (i.e., tubulent flow).

(a) $\quad R_p = 0.005 a^{3/2} b^{-1/2} Q^{3/2} V_p^{-1/2} d_p^{1/2}$ (b) $\quad R_p = 0.137 a^{6/5} b^{-4/5} Q^{6/5} V_p^{-1/5} d_p^{1/5}$ in which:

$a$=the distance in centimeters from the axis to the tip of the stirrer blade.
$b$=average width of stirrer blade in centimeters.
$Q$=stirring speed in r.p.m.
$V_p$=viscosity of the precipitant in poises.
$d_p$=density of the precipitant in gm./cc.

$$R_e = \frac{\pi}{60} ab \frac{d_p}{V_p} Q$$

Where precipitation is performed in a "tube" precipitator as described hereinafter, $R'_s$ is defined in Equations (c) and (d) for laminar and turbulent flows respectively:

(c) $\quad R'_s = 1.27 \frac{V_p F}{V_s r_o} t$ (d) $\quad R'_s = 0.0527 \frac{V_p^{5/8} F^{11/8} d_p^{3/8}}{V_s r_o^{27/8}} t$ wherein $F$ is the rate of flow of precipitating bath in cubic centimeters per second, $r_o$ is the radius of the tube in centimeters and the Reynolds number ($R_e$) is defined by the expression:

$$R_e = \frac{F d_p}{\pi r_o V_p}$$

the remaining values being as defined above.

In calculating $t$ for these systems, it is assumed that the solution droplet in the shear zone coagulates or precipitates because coagulant, or precipitant diffuses from the bath into the drop until a certain critical concentration is obtained at a distance of 0.1 micron from the droplet surface. This critical concentration is the "Molarity Needed for Coagulation." It will be designated C and expressed in mols per liter.

The diffusion equation which is appropriate for these calculations is:

(e) $\quad C = C_o [1 - \chi(x/2\sqrt{Dt})]$ where $C$=Molarity needed for coagulation
$C_o$=bath concentration (molar)
$x$=distance diffused (0.1 micron)
$D$=diffusion constant ($10^{-5}$ cm.$^2$/sec.)

(f) $\quad \chi = \frac{2}{\sqrt{\pi}} \int_0^{x/2\sqrt{Dt}} e^{-y^2} dy$

There is good theoretical justification for selecting values close to 0.1 micron for $x$ and close to $10^{-5}$ cm.$^2$/sec. for D, although the selection of these exact values is somewhat arbitrary. For convenience, it is assumed that D is the same for all ions, since this assumption introduces little error in the final calculations.

The value of C will depend on such variables as cellulose concentration, caustic content, DP, additives, etc. However, all of these variables are taken into account by the salt index S, which is commonly used in the viscose industry, and this measurement can be used equally as readily for the cellulose ether solutions or the cellulose etherester solutions of this invention. By the use of one cellulose ether solution as a standard, a Table of Molarities (C values) can be developed for the various salt solutions which are commonly used for precipitating cellulose ether or cellulose etherester solutions. C should, therefore, be multiplied by $S/S_{std}$ before applying Equation (e) to a solution which has an index other than the standard chosen. S is the index of the solution being used and $S_{std}$ is the index used for developing the Table of Molarities. The proper equation is then, (g) $\quad Y = \frac{SC}{S_{std}.C_o} = 1 - \chi\left(\frac{x}{2\sqrt{Dt}}\right)$ Values of $t$ are calculated by substituting selected values for $SC/S_{sdt}.C_o$ in Equation (g). When these calculated values of $t$ are plotted against $SC/S_{std}.C_o$, it is found that $t$ becomes infinite when $SC/S_{std}.C_o$ becomes 1. Physically, this means that the fibrous precipitates of this invention cannot be formed when Y (i.e., $SC/S_{std}.C_o$) is greater than 1. Accordingly, a graph is constructed showing the relationship between $t$ and Y by selecting values of Y between 0 and 1. If C is not known it may be determined by the salt index method, and calculating corresponding values of $t$ or determining $t$ from a suitable Table of Integrals. Thus, Y can be calculated from the available experimental data on the coagulation bath and $t$ determined from the graph.

If the salt index is determined directly for the bath which is being used, the method described above will apply equally well to single component and multi-component baths. The Table of Molarities Needed for Coagulation can, of course, be used directly for a single component bath. If no values are available for the multi-component bath used, an excellent approximation of the correct value for Y can be obtained by calculating with the aid of the following equation, using the values for each individual component taken from the Table of Molarities.

(h) $\quad Y = \frac{S}{S_{std.}} \cdot \cfrac{1}{\cfrac{C_{o,1}}{C_{1crit.}} + \cfrac{C_{o,2}}{C_{2crit.}} + \cfrac{C_{o,3}}{C_{3crit.}}}$ in which:

$C_{o,1}$=molar concentration of component 1
$C_{o,2}$=molar concentration of component 2
$C_{o,3}$=molar concentration of component 3 and $C_{1crit.}$=molarity of component 1 needed for coagulation in a 1-component bath
$C_{2crit.}$=molarity of component 2 needed for coagulation in a 1-component bath
$C_{3crit.}$=molarity of component 3 needed for coagulation in a 1-component bath This type of calculation can be extended to a bath containing more than three components, but such baths are generally not used. Obviously, the equation can be used for a two-component bath system.

TEST AND CHARACTERIZATION PROCEDURES

Water absorption in Examples I to IV hereinafter is measured by distributing evenly, without compression, a 2 gram sample of the material in a Buchner funnel (2½" diameter by 1 3/16" deep). Water (100 ml.) containing 0.1 gram of sodium lauryl sulfate is poured over the sample and allowed to drain by gravity for about 1 minute. The funnel is then connected to an overflowing reservoir so as to produce a ⅜" head of water in the funnel at equilibrium. When water begins to flow into the funnel, a No. 11 rubber stopper weighing 67.4 grams is placed on the sample with the large face down. A 2 lb. weight is placed on the stopper. After 10 minutes, the petcock is turned to permit the sample to drain. After an additional 10 minutes, the sample is removed and weighed. The increase in weight is the amount of water absorbed.

Water absorption of the remaining samples is determined by a different technique wherein a sample of the material to be tested weighing approximately 1 gram is placed in a small container and soaked in about 30 grams of water at room temperature for 30 minutes. The sample is removed and spread out to cover a 2" x 2" square area on bleached sulfite blotter paper. The sample is placed between layers of blotter paper and loaded with a 3 kilogram weight to give a pressure of 1.6 lb./sq. in. Pressure is applied for five minutes after which the sample is removed and weighed, giving the wet weight. Then the sample is dried to constant dry weight using a Noble and Woods sheet dryer at 100° C. Absorbency equals wet weight minus dry weight divided by dry weight. The broad ranges of absorbency characteristics recited herein are with reference to this latter test procedure.

Although the results of the two water absorption test procedures recited above are not directly interchangeable, nevertheless it has been found that they are related in that the results obtained in the process employed in Examples I to IV may be converted approximately to values attained by the technique employed in the other examples by multiplying the results attained in Examples I to IV by a factor between about 0.5 at the higher range of water absorbency (i.e. around 20 grams water per gram of sample) to about 0.7 at the lower range of water absorbency (i.e. at about 10 grams of water per gram of sample).

The salt index used to determine the effectiveness of coagulating baths is based upon the fact that the cellulose ether solution is partially precipitated when a drop of the solution is dispersed in an aqueous sodium chloride solution. When a definite and reproducible degree of coagulation is adopted as the end point and the manner of dispersing the solution is standardized, the concentration of sodium chloride required to reach the end point is a direct and reproducible measure of the coagulability of the solution. The concentration (expressed in percent) of salt solution which produces this end point is reported as the index. The technique employed in its determination is exactly the same as that employed in the viscose rayon industry for regenerated cellulose.

The tensile strength (lb./in./oz./yd.$^2$) and elongation (percent) of the various products illustrated herein are determined on an Instron electronic tensile tester. The "work to break" data (lb./in./oz./yd.$^2$) represent the area under the stress-strain curve obtained with an Instron electronic tensile tester. Elmendorf tear (g./g./in.$^2$), porosity (sec./100 cc.), burst (p.s.i./oz./yd.$^2$), M.I.T. fold (cycles) and Canadian Standard Freeness (ml.) are determined by TAPPI tests T414–49, T460–49, T403–53, T423–50 and T227–58 respectively. Puncture tests are performed using the Spencer Puncture Tester as manufactured by the Thwing-Albert Instrument Company, Philadelphia, Pa., using a 5/16 inch diameter probe rod having a 5/16 inch hemispherical radius.

The following examples are cited to illustrate the invention. They are not intended to limit it in any manner.

Example I

Six pounds of cotton linters are steeped in 18% caustic at 27.5° C. for 45 minutes. After the caustic has been drained, the alkali cellulose is shredded for 80 minutes at 27.5° C., aged for 9½ hours at 27.5° C. and thereafter placed in a baratte with 31.4% by weight (based on the weight of cellulose) of carbon disulfide and 0.12 grams of acrylonitrile for each gram of alkali cellulose. These reactants are mixed for 2½ hours at 5° C. Sufficient caustic is then added to produce a solution containing 5.0% cellulose and 5.5% caustic (calculated as sodium hydroxide). The cellulose etherester has 16.5% of the available hydroxyl groups substituted with cyanoethyl groups (i.e., has a degree of substitution of 0.5 with respect to cyanoethyl ether groups). The cellulose etherester has an index of 20 and a viscosity of 32 Du Pont seconds (9.9 poises).

100 grams of this solution is added at room temperature to 400 ml. of a coagulating bath in a 1-qt. Waring Blendor operating at approximately 9,200 r.p.m. The aqueous coagulating bath (C value of 1.11) contains 18.5% by weight of sodium sulfate (Co of 1.77), 9.5% by weight of zinc sulfate (Co of 0.80), and 10% by weight of sulfuric acid (Co of 1.39). The system has a Y value of 0.0066, a $t$ of 0.67 microsecond and an $R'_s$ of 71. The fibrous regenerated cellulose ether formed is washed thoroughly with water, rinsed with acetone and air-dried. The dried product has a water absorbency under the load of about 39 grams per square centimeter of 11.3 grams per gram.

Upon repetition of the experiment with the Waring Blendor operating at approximately 13,800 r.p.m., the cellulose ether obtained has a water absorbency under a load of 39 grams per square centimeter of 14.5 grams per gram. In this system $R'_s$ is 114.

A product with a water absorbency of 22.3 grams per gram under a 39 gram per square centimeter load is formed when the above technique is modified by use of an aqueous coagulating bath containing 20% by weight of sodium sulfate and 0.5% by weight of lauryl pyridinium chloride. After precipitation is complete, 300 ml. of a 5% sulfuric acid solution are added to the blendor and the mixture is allowed to stand without stirring for 5 minutes. The fibrous regenerated cellulose ether precipitate is washed with 10 liters of water, rinsed with acetone, and air-dried.

A regenerated cellulose ether with an absorbency of 11.4 under the 39s gram per square centimeter load is obtained when the cellulose etherester is coagulated in a 15% ammonium sulfate solution and the coagulum soaked in a 5% sulfuric acid solution at room temperature for 5 minutes. When these baths are replaced with a 17% solution of sodium sulfate buffered to pH 3 with a phosphate buffer, a fibrous regenerated cellulose ether with a water absorbency of 13.9 grams per gram under the load of 39 grams per square centimeter is obtained.

Example II

A cellulose etherester is prepared as described in Example I. The theoretical degree of substitution, based on the compositions charged to the baratte, is 0.5 with respect to cyanoethyl groups, although subsequent infrared analysis indicated that a substantial percentage of these cyanoethyl groups have hydrolyzed to carboxyethyl groups on standing. The solution, which contains 5% by weight of cellulose, is ripened until it has a viscosity of 32 Du Pont seconds (9.9 poises) and a salt index of 20.5.

Absorbent fibrous precipitates are formed by injecting this solution into a precipitant flowing through a tube 10 cms. long with an inside diameter of 2 mm. Equidistant from the two ends of the tube are six 20 mil diameter holes spaced an equal distance from each other. An aqueous precipitating bath having a density of 1.36 grams/cc. and a viscosity of 0.01 poise and containing 9.7% by weight of sulfuric acid, 5.5% by weight of zinc sufate, and 17.4% by weight of sodium sulfate is introduced at the inlet at a rate of 45 ml. per second under a pressure of 46 p.s.i. The cellulose etherester solution is introduced through the hole at a center of the tube at a rate of 22 ml. per second under a pressure of 60 p.s.i. The system has a Y value of 0.0102, a $t$ of 0.75 microsecond and an $R'_s$ of 111. The effluent mixture of solution and precipitant contains about 1.6% by weight of the fibrous precipitate formed. This is separated by filtration and washed thoroughly with water. The filter cake is then rinsed with acetone, dried in air for about 15 hours, and then in an oven at 80° C. for approximately ½ hour. The dried product has a water absorbency of 17.4 grams per gram.

Example III

A cellulose etherester with a degree of substitution of ether groups of 0.5 is prepared as described in Example I. The viscous solution, which contains 5% by weight of cellulose, is ripened until it has a viscosity of 26 Du Pont seconds (8.1 poises) and a salt index of 21.5. Absorbent fibrous precipitates are prepared from this solution by the use of another tube 10 cms. long with a 2 mm. inside diameter. However, in place of the single row of holes, there are 3 rows of twelve 10 mil diameter holes. The first row of holes is 4.2 cms. from the entrance of the tube and the rows are 2 mm. apart. An aqueous precipitant having a density of 1.36 grams per cc. and a viscosity of 0.01 poise containing 8.0% by weight of sulfuric acid, 1.5% by weight of zinc sulfate, and 17.0% by weight of sodium sulfate, is introduced at the enrtance of the tube at a rate of 37 cc. per second. The cellulose etherester solution is introduced in through the three rows of holes at a rate of 290 ml./min. The system has a Y value of 0.024, a $t$ of 0.98 microsecond and an $R'_s$ of 134. The absorbent cellulose ether fibrous precipitate is separated from the effluent by filtration, washed thoroughly with water and acetone, and dried at room temperature in a stream of air. The fibrous precipitate has a water absorbency of 18.4 grams per gram.

Example IV

A cellulose etherester with a degree of substitution of ether groups of 0.3 is prepared as described in the first example. The solution, which contains 5% by weight of cellulose, is ripened until it has a salt index of 21.6 and a viscosity of 19 Du Pont seconds (5.9 poises). Absorbent fibrous precipitates are prepared using the apparatus of Example III. The aqueous precipitant, which contains 9.5% by weight of sulfuric acid, 9.5% by weight of zinc sulfate, and 17.5% by weight of sodium sulfate, has a density of 1.36 grams per cc. and a viscosity of 0.01 poise. It is introduced at a rate of 36 cc. per second under a pressure of 46 p.s.i. The cellulose etherester solution is introduced under a pressure of 60 p.s.i. The system has a Y value of 0.0072, a $t$ of 0.68 microsecond and an $R'_s$ of 131. A 0.9% consistency slurry is obtained at a rate of 43 ml. per second. The fibrous precipitate is washed thoroughly with water and dried for 20 minutes in a column of air heated to 88° C. The dried product has a water absorbency of 17.0 grams per gram.

Example V

Conventional cotton linter sheets are steeped in caustic soda solution, and thereafter hydraulically pressed to a 3/1 (solids/liquids) press weight ratio. The sheets of alkali cellulose are then shredded, and held for subsequent processing in a refrigerated space at under 5° C. The cotton linter alkali cellulose so produced has the composition shown below:

| | Percent by wt. |
|---|---|
| Precipitatable cellulose | 31.2 |
| Sodium hydroxide | 15.75 |
| Water | 53.05 |

Twenty pounds of the above alkali cellulose are charged to a 12-gallon baratte. The baratte is rotated and warmed to an internal temperature of 25° C. at which time 969 grams (2.13 pounds) of carbon disulfide and 1030 grams (2.27 pounds) of acrylonitrile is added over a ten minute interval. During the simultaneous xanthation and cyanoethylation the temperature of the reaction mass is maintained at about 30° C. The reaction requires about 30 minutes and its termination is indicated by a cessation of the evolution of heat by the reaction mass. The cyanoethyl cellulose xanthate product is then dissolved in a 4% sodium hydroxide solution and cooled to 5° C. Properties of the cyanoethyl cellulose viscose at this point are shown in Table 1.

TABLE 1

Salt index—18
Viscosity—range from 30 to 50 Du Pont seconds at 18° C.
Percent cellulose—5.0 (approx.)
Percent alkalinity—5.44
Percent total sulfur—1.12
Percent total nitrogen—0.43

The solution is shear precipitated using the equipment of FIG. 24. In this run a single circumferential ring of twelve holes 2 having a diameter of 0.02 inch in a ⅛ inch tubing 1 is used. An aqueous precipitant containing 5% by weight sulfuric acid and 15% by weight sodium sulfate is fed at a temperature of about 35° C. and under a pressure of about 120 pounds per square inch gauge. The cellulose ether is fed to the tube precipitator at 19° C. under a pressure of about 80 pounds per square inch gauge. The fibrous product is collected on a wire screen and compressed with a squeeze roller into a ½ inch thick mat. The particle mats are then stored at room temperature for at least 30 minutes to insure complete regeneration of the cyanoethyl cellulose and thereafter simultaneously neutralized and dewatered osmotically with a bath containing 17 percent by weight of sodium sulfate and 2 percent by weight of disodium monohydrogen phosphate, adjusted to a pH between 5.0 and 6.0. After draining to approximately 10 percent by weight of solids, the mass is centrifuged to about 30 percent by weight solids. Phase-contrast photomicrographs of typical particles formed are shown in FIGS. 11 to 17, inclusive. These specimens are in the wet condition in phase-contrast, at 100×. The ribbon-like and microcellular structures can be seen readily in these figures. FIG. 8 is X-ray diffraction pattern of a particle of the present invention. It is readily distinguishable from that of cyanoethylated cotton, shown in FIG. 9. FIG. 10 is a photometer trace of diffraction patterns of FIGS. 8 and 9, curve $h$ being the trace of the pattern of FIG. 8 while curve $i$ is the trace of the pattern of FIG. 9. While the areas under the curves (indicating degree of substitution) are substantially equal, the trace of the cyanoethylated cotton is characterized by abrupt peaks indicating a much higher degree of crystallinity. The particles, ready for further use, are analyzed for nitrogen content, to determine their D.S. (degree of substitution) which is found to be 0.42.

The product obtained in this manner is suitable for use in sheet formation, either alone, or as a binder for staple fibers.

A sheet is prepared on a handsheet mold from an aqueous suspension containing 85% by weight of 2½ d.p.f., ¼ inch staple rayon fibers, and 15% of the dewatered particles. Physical properties of the sheet after drying 10 minutes at 100° C. between polyester fiber fabric are given in Table 2.

TABLE 2

Basis weight—1.421 ounces per square yard
Nitrogen content—0.465 percent by weight
Binder particle content (N basis)—14.14 percent by weight
Instron:
  Tensile strength—5.37 pounds per inch per ounce per square yard
  Elongation—6.0 percent
  Modulus—301.4 pounds per inch per ounce per square yard Work-to-break—0.246 pounds per inch per ounce per square yard Elmendorf tear factor—3.86 grams per gram per square meter M.I.T. fold endurance—362 cycles Burst—18.31 pounds per square inch per ounce per square yard The absorbent pad of a large disposable ("Chux") diaper is replaced by two layers of paper, one weighing 10 gms. and measuring 14" x 13", containing 52% of the dewatered particles as prepared above and 48% cellulose linters (reconstituted "Doeskin" tissue). The second paper which is in contact with the polyethylene diaper backing, weighs 6 grams, measures 12" x 12" and contains 75% of the dewatered particles as prepared above and 25% cellulose. The diaper absorbs 77 gms. of urine with no run off and with two thirds of the absorbent pad remaining dry. A commercial "Chux" diaper, weighing 20 grams, is completely saturated by 77 grams of urine.

The dissolved cyanoethylated cellulose described above is spun directly into fibers using a spinneret having 40 x 3 mil holes and an aqueous coagulating bath of 9% $H_2SO_4$, 9% $ZnSO_4$, 17% $Na_2SO_4$ kept at 50° C. A jet delivery of 10.5 ml./min., a wind-up speed of 80 y.p.m. and a back pressure on the spinneret of 110 p.s.i. are employed. The yarn is cut from the bobbin and washed by suspending it in running water till it is neutral to methyl red. It is then placed in 3 successive acetone baths until all the water has been replaced by acetone. During this acetone treatment the washed yarn, which while originally highly swollen and gelatinous, becomes opaque-white, tough and deswollen. The acetone is finally removed by evaporation. The dry yarn is very soft, fluffy and cardable. The average physical properties of single filaments is $$T/E/Mi = 0.9/23/24$$

and the denier is 2.4. The nitrogen content is 3.10%, corresponding to a D.S. of 0.4. The absorbency of the dried yarn is 18.7 gm./gm. The photomicrograph of FIG. 18 shows that the yarn contains many small voids which can hold water. A photomicrograph of a cross sectional elevation of the fibers, FIG. 19, shows the voids arranged in grape-fruit like pattern.

When the jet delivery is decreased to 1.3 ml./min. and the wind-up speed is reduced to 10 y.p.m., with a resultant back pressure on the spinneret of 25 p.s.i., the average physical properties of single filaments of the acetone dried yarn is $T/E/Mi = 0.7/37/19$ and the denier is again 2.4. The nitrogen content is 3.06% and the absorbency of the dried yarn is 11.2 gms./gm. A photomicrograph of a cross-sectional elevation of these fibers, FIG. 20, shows fewer voids of smaller size than those of FIG. 19 at the same overall denier.

Example VI

Following the technique of Example V, 16.0 lbs. of aged alkali cellulose are reacted with a blend of 1.71 lbs. of carbon disulfide and 2.28 lbs. of acrylonitrile for 80 minutes at 20° C. The modified xanthate is then dissolved by addition of 16.75 lbs. of 18% sodium hydroxide and 64.4 lbs. of water followed by mixing for 2 hours at 2–5° C. The solution (5.31% alkalinity, salt index of 21.0, viscosity of 44 Du Pont seconds, 1.1% sulfur and 0.37% nitrogen) is thereafter precipitated in the tube of FIG. 24 having a 36 hole (0.020" hole diameter) orifice array as described in Example III. An aqueous regeneration bath containing by weight 9% zinc sulfate, 9% sulfuric acid and 17% sodium sulfate and the solution of ether are delivered to the precipitation tube at 2.0 gallons/min. and 1490 gms./min., respectively.

The particles, collected and washed with water, contain 3.3% nitrogen and absorb 21 times their own weight of water. On the same basis, absorbent cotton has an absorbency of less than 1.5 gms./gm.

Example VII

This example illustrates the use of a synthetic wetting agent on the precipitated particles which permits their drying using heat. While not as supple as particles dewatered in the absence of heat, these particles are suitable as binder particles and as absorbers. Preferably they are carded.

The solution of cyanoethylated cellulose prepared as described in Example VI is spun into a yarn of 3 denier filaments using an aqueous regeneration bath containing by weight 9% zinc sulfate, 9% sulfuric acid and 17% sodium sulfate. 2 gms. of the yarn are cut into 1" lengths and dispersed in 2 liters of water containing 15 ccs. of 2% by weight of sodium lauryl sulfate (a synthetic wetting agent). After 2 minutes stirring, 3 liters of water are added and the staple is deposited on an 8"×8" polyester fiber cloth. The swollen staple is then dried between cloth under tension on a Noble and Wood hot plate at 100° C. A weak sheet of cyanoethylated cellulose staple fibers is formed which can be easily carded into a soft, bulky, high swelling structure.

In other experiments, a similar cardable product is obtained using at least about 0.1% by weight based on the precipitated particles synthetic fabric conditioners and fabric softening agents in place of the wetting agent.

Example VIII

If the solution of cyanoethylated cellulose is permitted to age prior to forming into a shaped structure, the resulting product is still highly absorbent. As shown in this example there is a difference in absorptive capacity depending upon whether the product is in the salt or acid form.

The solution of cyanoethylated cellulose made as described in Example VI is allowed to stand for 9 days at 0° C. The solution is then warmed to 20° C. and after 6 hours is spun at 50° C. as filaments into an aqueous bath containing by weight 9% zinc sulfate, 17% sodium sulfate and 9% sulfuric acid. The 2 denier filaments have an absorbency which is pH sensitive. Thus, after treatment with 0.01% sodium hydroxide, the absorbency is 54 gms./gm. After treatment with 10% sulfuric acid the absorbdency is 7 gms./gm.

Examples IX to XI, inclusive, which follow illustrate modifications of the chemical process for the preparation of the cellulose ethers of this invention.

Example IX

To 454 gms. of alkali cellulose crumb is added 48.5 gms. of $CS_2$ in a balloon flask. The crumb is tumbled in the flask for 80 mins. at 27° C. To the cellulose xanthate crumb is then added 51.5 gms. acrylonitrile and the crumb is tumbled for a further 80 mins. As soon as the acrylonitrile is added the color of the crumb changes from orange to yellow. Xanthated and cyanoethylated crumb (277 gms.) is thereafter dissolved in 968 gms. of 3.7% NaOH over a period of 2½ hrs. at 5° C. 80 gms. of this viscose solution is shear precipitated into 300 ml. of a 5% $H_2SO_4$, 15% $Na_2SO_4$ bath in a Waring Blendor at maximum voltage. The washed particles have a water absorbdency of 26.0 gms./gm., and a nitrogen content of 3.53%, equivalent to a D.S. of 0.47.

When the above procedure is modified by use of 24 gms. of $CS_2$ the washed particles have a water absorbency of 10.0 gms./gm. and a nitrogen content of 3.80%, equivalent to a D.S. of 0.51.

Example X 51.0 gms. of acrylonitrile are added to 448 gms. of alkali cellulose in a balloon flask. The alkali cellulose is tumbled in a bath kept at 27° C. for 221 min. Then 82.4 gms. of this cyanoethylated alkali cellulose is dissolved in 700 ml. of 10% NaOH at an average temperature of 8° C. for 130 min. This gives a solution containing 3.1% cyanoethyl cellulose in 10.6% NaOH. 80 ml. are precipitated at a time with 400 ml. of aqueous acid bath (5% $H_2SO_4$/15% $Na_2SO_4$) in a Waring Blendor at maximum voltage. The absorbency of the washed particles is 10.5 gms./gm.; and the nitrogen content is 3.34%, equivalent to a D.S. of 0.44.

Example XI 96.3 gms. alkali cellulose are placed in a desicator. 8.0 gms. acrylonitrile are placed in a beaker, frozen solid, and the beaker placed on the desiccator tray above the alkali cellulose. The desiccator is then evacuated to 5 mm. of Hg by a pump and isolated from the pump before the acrylonitrile has time to melt. After 115 min. there is no more acrylonitrile left in the beaker and the reaction is judged to be complete. 45.5 gms. of the cyanoethylated alkali cellulose are dissolved in 250 ml. of 10% NaOH for 80 min. The 150 ml. of the solution is precipitated in 400 ml. of an aqueous acid bath containing by weight 5% $H_2SO_4$ and 15% $Na_2SO_4$ in a Waring Blendor at maximum voltage. The absorbency of the washed particles is 7.9 gms./gm. and the nitrogen content is 2.14%, equivalent to a D.S. of 0.27.

Examples XII to XIV, inclusive, which follow, illustrate the preparation of cellulose ethers other than the cyanoethylated product.

Example XII

A flask and a vertical graduated tube connected thereto by valving means are evacuated to about 5 mm. of mercury after charging the flask with 150 gms. of alkali cellulose and the tube with 17.9 gms. of condensed ethylene oxide. The valve between the ethylene oxide tube and the flask is closed and the frozen ethylene oxide is melted by an ice-water bath. Gaseous ethylene oxide is then allowed to distill over into the flask containing the alkali cellulose at a rate to control the reaction temperature at no higher than 45° C. The total reaction time is 5½ hrs.

164.3 gms. of the hydroxyethylated alkali cellulose so produced is dissolved in 660 ml. of 4% aqueoue NaOH. The theoretical solids content is 6.7%. The solution is then spun through a spinneret having 40 x 3 mil holes into an aqueous coagulating bath containing by weight 5% $H_2SO_4$ and 15% $Na_2SO_4$ at 25° C. The jet delivery is 1.75 ml./min. and the wind-up speed is 30 y.p.m. The yarn is washed and thereafter dewatered by extraction with acetone. The average physical properties of single filaments is T/E/Mi=0.91/29/33 and the denier is 1.0. The absorbency of the yarn is 13.9 gms./gm.

Shear precipitation (instead of spinning) of the same solution into the same coagulating bath, procedure particles having a similarly high degree of water absorbency.

Example XIII

The technique of Example XII is followed using 50 gms. of alkali cellulose and 15.9 gms. of propylene oxide. The temperature does not rise above 33° C. during the total reaction time of 6.5 hours. 30 grams of the hydroxypropylated alkali cellulose is dissolved in 200 ml. of 10% aqueous NaOH at 10° C. 50 grams of this solution is shear precipitated in 400 ml. of an aqueous bath containing by weight 9% $H_2SO_4$, 9% $ZnSO_4$ and 17% $Na_2SO_4$ in a Waring Blendor at maximum voltage. When washed acid free these particles have an absorbency of 7.0 gms./gm.

Example XIV

A mixture of 10 gms. of finely ground cotton linters in 215 ml. of isopropanol to which 55 ml. of 18% aqueous NaOH is added over a period of 30 min. is stirred for an additional 30 min. A solution of 3 gms. of chloroacetic acid dissolved in 20 ml. of isopropanol is thereafter added dropwise with stirring, over a further 30 min. period. The mixture is then slowly heated up to 60° C. over a one hour interval and stored at that temperature for another 4 hours. The modified linters are thereafter filtered from the reaction solution and mixed with 300 ml. of 70% methanol. Acetic acid is added to neutralize the NaOH. The linters are filtered, washed three more times with 70% methanol and finally with pure methanol. This material as made has an absorbency of only 3.2 gm./gm.

Five grams of the dry product prepared above is dissolved by first adding 90 ml. of water to wet it uniformly and then adding 40 ml. of 18% NaOH, giving a 3.8% solution in 5.5% NaOH. 70 grams of the resulting solution are shear precipitated in 400 ml. of an aqueous solution containing by weight 9% $H_2SO_4$, 9% $ZnSO_4$ and 17% $Na_2SO_4$ in a Waring Blendor using maximum voltage. The precipitated particles are then washed salt free, and to ensure being in the acid form are soaked in 15% $H_2SO_4$ for two hours and then rewashed. The absorbency of the particles is 12.0 gm./gm. Part of the particles are converted to the sodium salt form by soaking in 2% NaOH and rewashing. These have an absorbency of 30 gm./gm. Another part of the particles in the acid form are soaked in 7% $NH_4OH$ to make the ammonium salt, and after washing these had an absorbency of 18 gm./gm. The degree of substitution of the regenerated carboxymethyl cellulose is 0.27.

A theoretical development of the critical variables involved in shear precipitation has already been given. Tables 3 and 4 below illustrate the actual conditions and calculations contributing to a determination of $R'_s$ for several different systems. These tables summarize the systems described in Examples I to V, and show as well several other systems. Specifically, Examples XV, XVIII and XX show operations outside the required range of $R'_s$ values. The other examples in these tables are within the scope of the invention, and give satisfactory products.

TABLE 3.—SHEAR PRECIPITATION CONDITIONS FOR FORMING BINDER PARTICLES

| Ex. No. | V,[1] poise | Salt index | $d_p$, g./cc. | Q or F, r.p.m. or cc./sec. | Bath composition,[2] wt. percent/$C_0$ (moles) | | |
|---|---|---|---|---|---|---|---|
| | | | | | $Na_2SO_4$ | $Zn_2SO_4$ | $H_2SO_4$ |
| I | 9.9 | 20 | 1.36 | [3] 9,200 | 18.5/1.771 | 9.5/0.776 | 10/1.386 |
| Ia | 9.9 | 20 | 1.36 | [3] 13,800 | 18.5/1.771 | 9.5/0.776 | 10/1.386 |
| II | 9.9 | 20.5 | 1.36 | | 17.4/1.665 | 5.5/0.464 | 9.7/1.344 |
| III | 8.1 | 21.5 | 1.36 | | 17.0/1.627 | 1.5/0.422 | 8.0/1.109 |
| IV | 5.9 | 21.6 | 1.36 | | 17.5/1.675 | 9.5/0.776 | 9.5/1.317 |
| V | 10.0 | 20.0 | 1.17 | [4] 56.0 | 15.0/1.235 | Zero | 5.0/0.596 |
| XV | 16.5 | 25 | 1.17 | [3] 13,800 | 10.0/0.823 | Zero | Zero |
| XVI | 16.5 | 25 | 1.17 | [3] 13,800 | 6.3/0.518 | Zero | 3.4/0.405 |
| XVII | 16.5 | 25 | 1.17 | [3] 13,800 | 9.0/0.741 | Zero | 1.0/0.12 |
| XVIII | 16.5 | 25 | 1.36 | [3] 500 | 17.0/1.627 | 9.0/0.735 | 9.0/1.247 |
| XIX | 0.17 | 22 | 1.17 | [3] 13,800 | Zero | Zero | 2.0/0.238 |
| XX | 0.17 | 22 | 1.17 | [3] 13,800 | Zero | Zero | 1.0/0.119 |
| XXI | 17.6 | 20 | 1.17 | [4] 56.0 | 14.85/1.223 | Zero | 5.10/0.068 |
| XXII | 30.7 | 20 | 1.231 | [4] 76.0 | 17.0/1.473 | 1.5/0.110 | 8.0/1.003 |
| XXIII | 31.0 | 20 | 1.214 | [4] 34.6 | 16.59/1.417 | Zero | 9.11/1.127 |
| XXIV | 10.5 | 20 | 1.17 | [4] 56.0 | 15.74/1.296 | Zero | 5.08/0.605 |

[1] For all entries, $V_p$=0.01 poise.
[2] For all entries, $C_1$ crit. ($Na_2SO_4$)=2.20, $C_2$ crit. ($ZnSO_4$)=0.006, $C_3$ crit. ($H_2SO_4$)=0.050.
[3] Using Waring Blendor, a=3.0 cm., b=0.7 cm.
[4] Using tube precipitator, r0=0.1 cm.

TABLE 4.—CALCULATION OF R'ₛ AND RELATED VALUES FOR SHEAR PRECIPITATION PROCESS

| Ex. No. | Rₐ | Y | Rₚ | t microseconds | R'ₛ | Comments |
|---|---|---|---|---|---|---|
| I | 137,580 | 0.0079 | 104.9 | 0.70 | 73.4 | Blendor used. Particles highly absorbent. |
| Ia | 206,370 | 0.0079 | 170.66 | 0.70 | 119.5 | Blendor used. |
| II | 19,480 | 0.0102 | 149.4 | 0.75 | 111 | Tube precipitation. |
| III | 16,017 | 0.0309 | 139.5 | 1.09 | 152 | Do. |
| IV | 15,584 | 0.0086 | 184.5 | 0.72 | 132.5 | Do. |
| V | 20,855 | 0.1001 | 188.8 | 1.86 | 351.2 | Tube precipitation. A preferred binder. |
| XV | 177,530 | | 96.4 | 00 | 00 | No coagulation. Bath inadequate. |
| XVI | 177,530 | | 96.4 | 2.7 | 260 | Blendor used. Fine particle formation. |
| XVII | 177,530 | | 96.4 | 16 | 1,540 | Blendor. Fine particle formation. |
| XVIII | 7,477 | | 1.85 | 0.76 | 1.4 | Blendor. Polymer recovered as chunks wrapped around stirrer. Shear rate too low. |
| XIX | | 0.2882 | 1,528.4 | 4.6 | 7,020 | High shear value. Some particles retained. Borderline process conditions. |
| XX | | 0.5763 | 1,528.4 | 15.5 | 23,800 | Very high shear value. No particles. Product recovered as a gel. |
| XXI | 20,855 | 0.0983 | 107.3 | 1.82 | 195.3 | Tube. Particles good. |
| XXII | 29,779 | 0.0319 | 95.4 | 1.07 | 102 | Do. |
| XXIII | 13,370 | 0.0538 | 31.9 | 1.35 | 43.1 | Tube. High absorbency particles. |
| XXIV | 20.855 | 0.0984 | 179.9 | 1.82 | 327.4 | Tube. Good particle formation. |

Alkali cellulose may be prepared from any convenient source of cellulose, such as cotton linters, chemical pulp, ground pulp, waste stock and used newsprint. Standard commercial reactive conditions are satisfactory. Alkali content should be between 15% and 30%, and 18% alkali is preferred. Alkali cellulose may be aged at least 1 hour, and up to 24 hours at room temperature. Aging at temperatures above 40° C. is undesirable. Alkali cellulose may be held for longer periods of time (even up to 200 hours), provided the temperature for times in excess of 24 hours is below 15° C. but above −5° C. Freezing is undesirable.

Etherification takes place by reaction of the etherification agent on alkali cellulose in the solid state. The etherification reaction occurs between about 5° C. and about 45° C., and preferably between about 15° C. and about 30° C. Preferably, the concentration of etherifying agent should not exceed about 20% (based on weight of alkali cellulose) at any time during the reaction. Reaction time is between 10 minutes and 10 hours, depending on the reactivity of the etherifying agent.

If desired, the cellulose ether obtained by etherification may be rendered more suitable for convenient subsequent processing by formation of a readily-soluble cellulose ether-ester such as cellulose ether xanthate. Such products may be formed, for example, by reaction of $CS_2$ on the solid-state cellulosic material. The xanthation reaction may occur simultaneously with the etherification, or may precede or follow it. Preferably, the two reactions take place substantially simultaneously. Xanthation reaction conditions commonly used in the rayon industry for the preparation of viscose are preferred. Desirably, the xanthation should take place to the extent of about one xanthate group per two anhydroglucose rings.

Following etherification (and optional xanthation), the substituted cellulose material may be aged before reprecipitation for 1 to 50 hours at a temperature above about 0° C. but below about 30° C.

The cellulose ethers which can be used in this invention have degrees of substitution between about 0.02 and about 0.7, preferably between about 0.1 and about 0.6. These cellulose ethers may contain more than one type of ether group. The most useful products are substantially insoluble in up to 30 times their own weight of water, although in commercial preparations as high as 25% by weight soluble cellulosic derivatives may be present as an impurity. Suitable derivatives include the alkyl ethers, such as ethylcellulose; the carboxyalkyl ethers, such as carboxymethylcellulose and carboxyethylcellulose; the hydroxyalkyl ethers, such as hydroxyethylcellulose; the arylalkyl ethers, such as benzylcellulose; and the beta-substituted alkyl ethers, such as cyanoethylcellulose. The preferred member of this class is cyanoethylcellulose.

Mixed ethers may also be used. For example, some of the nitrile groups in cyanoethylcelluloes may be hydrolyzed; part of these may stop at the amide stage and the remainder be converted to carboxyl groups. Thus, there would be three types of ether groups present. Mixed ether-esters may also be used, e.g., one containing a mixture of acetate and ether groups.

A variety of regenerated shaped products all within the scope of the present invention can be obtained by extrusion of a solution of the ether described above into a coagulating bath or by precipitating the cellulose ethers from solution within the range of total shear values defined herein to form fibrous particles. Extruded filaments are made using conventional techniques. The principal factors affecting the nature of the shear precipitated product are the solution viscosity, the extent of shear applied during coagulation, and the nature of the precipitating bath. Of these, the latter is the most important.

The over-all effectiveness of the coagulating sysem, i.e., rate of coagulation, shear applied, etc., is the primary factor regulating the process and the nature of the shear precipitated products claimed herein. The rate of coagulation has the greatest effect on the nature of the product obtained. Another very important variable is the extent of shear applied to the precipitate while it is deformable. Accordingly, the shearing is varied in conjunction with the coagulation rate to produce a fibrous product with the desired properties. If a more rapid coagulant is used, and it is desired to produce a similar product, it will be necessary to increase the rate of shear correspondingly. Both variables, such as viscosity and temperature, have less effect on the properties of the product than the nature of the coagulant.

The over-all effectiveness of the bath as a coagulating agent can be determined by the salt index method familiar to the rayon industry. Although this method has been limited to viscose solutions, it can be extended quite readily to alkaline solutions of cellulose ethers which are relatively insoluble in water. For convenience, a description is given of this method, as adapted to cellulose ethers.

The major requirement on the shearing conditions during coagulation is that the shear be adequate to extend the precipitate into the form of a fibrous or ribbin-like structure. Within the operable range, the shear may be varied appreciably while still producing products of comparable properties. Shearing action during coagulation is dependent to some extent upon the design of the stirrer and the vessel in which precipitation occurs. Suitable shearing action for preparing the products of this invention may be obtained by the use of a stirrer having the paddle or blade at an angle to the plane of rotation of the paddle or blade. The design of the stirrer blade used in a Waring Blendor has been found to be particularly satisfactory. Turbulence can be increased by introducing suitable baffles in the mixing vessel. The results indicated that fibrous precipitates with a particularly desirable morphology are obtained when precipitation occurs in a shear zone which is also turbulent. The combination of stirrer action and container design generally used in the practice of this invention produces precipitating conditions which combine turbulence with adequate shear.

Other types of apparatus may also be used if they provide sufficient shear and turbulence. For example, some cellulose ether solutions may be jetted into suitable coagulants to produce satisfactory absorbent products. Some of the examples illustrate the preparation of these products by injecting the cellulose derivative solution into a flowing stream of precipitant. Other modifications may be devised by those skilled in the mixing art.

The formula for $R'_s$ presented earlier is derived from the rate of shear, $R$, which is proportional to the shearing stress, $S$. Introducing the viscosity, $V$, as a proportionality constant, the equation becomes $$S = VR$$

Using the subscript $s$, for the solution and the subscript $p$, for the precipitant or coagulant, the shearing stress in the precipitant and in the solution is given by the equations $$S_p = V_p R_p \quad (1)$$
$$S_s = V_s R_s \quad (2)$$

It is reasonable to assume that the shearing stress is transmitted undiminished from the precipitant to the solution, so that $$S_p = S_s \quad (3)$$

and Equations 1 and 2 may be equated to give $$R_s = \frac{V_p}{V_s} R_p \quad (4)$$

The type of fiber products formed will depend on $t$, the time interval during which the precipitate is deformable. The product $R_s t$ will be designated $R'_s$ (the total shear), which is determined from the relationship $$R'_s = \frac{V_p}{V_s} R_p t \quad (5)$$

Some generalizations can be drawn about the process conditions without reference to any specific experimental results. For example, if the particles obtained upon precipitating the cellulose ether under a certain set of conditions are too fine, it will be necessary to decrease the shearing forces (by decreasing the stirring speed or by increasing the viscosity) and/or to increase the rate of coagulation. This latter effect can be accomplished by increasing the cellulose DP, the cellulose concentration, etc., or by increasing the salt concentration in the bath, or by heat-versely, if the particles are too coarse, the reverse changes can be made.

The cellulose ether solution or the coagulating bath, or both, may contain additives for modifying the nature of the products obtained. Either the solution or the precipitant may contain synthetic and/or natural staple fibers, such as those from nylon, poly(ethylene terephthalate), or polyacrylonitrile, staple fibers from cellulose glass fiber, asbestos, cellulosic pulps, etc. In addition, either may contain the fibrids described in copending applications Ser. No. 635,876, filed Jan. 23, 1957 now abandoned; Ser. No. 635,721, filed Jan. 23, 1957 now abandoned; Ser. No. 635,731, filed Jan. 23, 1957 now Pat. No. 3,062,702; Ser. No. 675,038, filed July 30, 1957 now abandoned; and Ser. No. 675,088, filed July 30, 1957 now abandoned. They may also contain dyes, antistatic agents, surfactants, fillers, such as silica or titanium dioxide, pigments, antioxidants, abrasives, lubricants, fire-retardant materials, dispersed or emulsified natural or synthetic resinous or polymeric materials, adhesives, gums, natural or synthetic fibers, and mineral materials. Specific additives which have been found useful include titanium dioxide, dispersed dyes, silica, wood flour, quaternary ammonium salts, emery dust, graphite, polytetrafluoroethylene resin powder, antimony salts, phosphates, synthetic elastomer acrylic resins, casein-type adhesives, polyamide resin granules, glass fibers, polyamide fibers, fibrids, asbestos, talc, cermets, metallic powders, and magnetic iron oxide powder.

In particular, pigments and fillers such as titanium dioxide may be added before precipitation, to give fibrous materials containing 20% to 70% of $TiO_2$ by weight of the total solids. In the form of sheet component particles, such compositions offer a superior way to add heavy concentrations of pigment to sheet products without substantial loss of pigment in the white water. For other end uses it is often more desirable to add fibrous materials to the precipitating or coagulating bath, because of the greater difficulty associated with dispersing them in the viscous cellulose ether solutions.

The cellulose ether solution may also contain dispersed polymer particles, such as polytetrafluoroethylene or polyacrylonitrile. After these modified solutions have been converted to fibrous precipitates, the cellulose ether may be removed by heating or by chemical action to form fine fibrils of the synthetic polymer which had been added.

Since the products of the present invention are highly swellable in the presence of water, precautions must be taken during their preparation to prevent their swelling or they must be after-treated to put them in the non-swollen form. As pointed out previously, drying by heat alone generally leads to the production of a horny, hard material little suitable as an absorbent although, as has been shown in the examples, heat can be used for moisture removal provided the swollen particle has a surface active agent present upon it. Another "dewatering" or "deswelling" procedure which may be employed is displacement of water in the shaped structure, as by acetone. While this system is highly successful and convenient in the laboratory, solvent recovery problems make it less desirable for large scale operations. A more practical deswelling procedure involves osmotic dewatering wherein the shaped structures are deswollen by relatively strong solutions of inorganic salts such as sodium sulfate. Such deswollen particles may be conveniently wet pressed or centrifuged to yield solids content compositions containing 30% by weight or higher. Sodium sulfate at the 17% level is a preferred salt, but other salts of high ionic strength may also be employed, such as magnesium or ammonium sulfate, phosphates, borates and other materials known in the viscose industry.

Since the regenerated shaped structure in the swollen form is difficult to process, it is preferred to avoid washing or other process steps that cause the freshly regenerated shape to be contacted with water. This is particularly true in processing shear precipitated particles due to their fibrous nature. As is illustrated in detail in Example V above, this can be done by a procedure wherein excess acid present in freshly precipitated structures is neutralized by a buffer, such as disodium monohydrogen phosphate in the presence of a salt such as sodium sulfate. An aqueous neutralizing solution containing from about 10% to about 20% by weight of sodium sulfate and from about 0.1% to about 2% by weight of disodium monohydrogen phosphate, adjusted with sulfuric acid and caustic soda to a pH of 5 to 6, is found to be successful in large scale production of the particles. Freshly coagulated structures may be lagged for 30 minutes or more, then added with strong agitation to a tank of neutralizing solution within which is maintained approximately 2% by weight of cellulose ether. Slurry may be removed from the bottom of the tank by a hose to a drainage barrel equipped with a drainage sack and a filtrate return pump. The 2% slurry from the tank is alloyed to drain to approximately 10% by weight cellulose ether, then is removed to a centrifuge for further removal and return of neutralizing solution. Centrifuging gives a material of 30% to 50% solids, of which over one-third may be sodium sulfate. Filtration in a multi-leaf filter press gives similar results. Drying with superheated steam permits an even higher solids content to be reached. Alternatively, the wet-pressed cake may be dried by passing in sheet form over dryer rolls to yield a soft sheet. Surprisingly, the residual sodium sulfate, which may comprise from 5% to 50% of the dry weight, contributes markedly to the softness and wick-ability of the dried product. The salt appears to crystallize within the pores of the particles in a manner such that there is no visual evidence of its presence, such as encrustations normally encountered when salt solutions are dried, in the fibrous product. A solid mass containing about 30% cellulose ether and 12% sodium sulfate is a preferred material.

Such a mass, containing no more than about 70% by weight water may be shipped in conventional containers without special handling, is dry to the touch in spite of the large water content, and can be stored for long periods of time without loss of properties or decomposition. It can be easily handled in conventional sheet-forming processes using paper-making techniques. Redispersal of the particles is achieved in the beater or stock chest. The salt component may be washed out at this point if desired without requiring any separate process steps. Alternatively, if desired, the material may be redispersed at a high concentration, permitting retention of much of the salt in the final sheet product.

The final products, whether extruded as filaments or films or shear precipitated as particles, of this invention are cellulose ether products having a water absorbency of at least about 7 grams per gram. The shear precipitated products with the best water absorbencies are usually the coarser, sponge-like types, which are most readily obtained in the lower half of the operable shear range. In other words, the most absorbent shear precipitated products are usually obtained in a system where coagulation occurs relatively slowly and the stirring rate is also in the lower end of the operable range.

Many of the shear precipitated products of this invention may be formed into coherent products by conventional paper-making or slush molding techniques. These products have the strong self-bonding or interlocking properties associated with conventional cellulosic pulps. Stronger paper-like sheets can frequently be prepared by beating the fibrous precipitates in conventional pulp beating equipment prior to formation of the sheet. These products, whether beaten on not, may be blended with cellulosic pulps or man-made fiber staple, or with fibrids, before preparation of sheet products. Thus, the products of this invention have the additional advantage that shaped articles may be prepared directly from the aqueous slurries in which they are formed.

The absorbent products of this invention have a number of important applications where their unusually high absorbency has been utilized, such as in sponges and in sanitary napkins. Additional uses are in surgical dressings, bandages, disposable diapers, paper towels, toilet paper, cosmetic pads, anti-perspirant pads, air filters, cigarette filters, seed planting sheets, soil humidifiers, slow curing additives in concrete, disposable bed pads, roof sealers, window tapes, leak sealers, drying agents for organic liquids, water dispersible film packages for detergents, in saline water purification processes, flower supports, hair straighteners, depilatories, detergent additives, binders in ceramics and pottery, and condenser tissues. Surgical dressings and bandages prepared from these products may be impregnated with antiseptics, antibiotics, or other appropriate medicinal agents.

Paper-like structures containing these products may be used for packaging food or tobacco to maintain high humidity. They may also be used as covers for freshly seeded ground to retain rainfall. The paper products can be readily marked in the usual manner, so they can be used in conventional paper applications. The paper or sheet products many also be used as substrates for subsequent coating operations. In all of the applications which have been discussed, the products of this invention may be used alone or in combination with other fibrous materials, particularly conventional cellulosic papermaking fibers. The addition of relatively small amounts of the absorbent products of this invention results in a substantial increase in the water retention of the modified papers.

There are other applications in addition to absorbent products and sheet products. For example, these fibrous precipitates may be used as surface modifiers, i.e., modifiers of surface or hand. They may also be used in greases, and as reinforcing agents for plastics, paint films, oils, caulking compounds, plaster, plaster board, etc. The good bulking qualities under compressive forces also make them useful for such applications as thermal insulation and sound barriers. They are also useful as soil conditioning agents.

Many equivalent modifications of the above will be apparent to those skilled in the art from a reading of the above without a departure from the inventive concept.

What is claimed is:

1. The process for the manufacture of an essentially water insoluble cellulose ether characterized by microscopic uniformity, a water absorbency of at least about 7 grams of water per gram of cellulose ether, a degree of ether, substitution of from about 0.2 to about 0.7 and a high level of chain segment mobility which comprises reacting alkali cellulose, in the solid state and having a caustic content of less than about 30% by weight, with from about 0.5 to about 3.0 moles of etherifying agent, thereafter dissolving and regenerating the reaction product and subsequently removing water from the said regenerated product.

2. The process of claim 1 wherein the solid alklai cellulose is reacted with carbon disulfide and, as etherifying agent, acrylonitrile.

3. The process of claim 2 wherein the reactions with carbon disulfide and acrylonitrile are performed simultaneously.

4. A method for preparing a modified viscose which comprises reacting alkali cellulose with a mixture containing from 16 to 60% of acrylonitrile and from 23 to 40% of carbon bisulfide, said percentage amounts being based on the weight of the cellulose, and dissolving the reacted cellulose in a dilute aqueous solution of alkali hydroxide.

5. A method of forming shaped cellulosic articles which comprises reacting alkali cellulose with a mixture containing from 16 to 60% of acrylonitrile and from 23 to 40% of carbon bisulfide, said percentage amounts based on the weight of the cellulose, dissolving the reacted cellulose in dilute alkali to form viscose, forming the viscose into a shaped article, and regenerating the viscose article.

References Cited

UNITED STATES PATENTS

| | | | |
|---|---|---|---|
| 3,114,747 | 12/1963 | Campbell | 260—212 |
| 2,332,049 | 10/1943 | Bock et al. | |
| 2,375,847 | 5/1945 | Houtz. | |

OTHER REFERENCES

Somers, J. New Family of Rayons, British Rayon and Silk Journal, pp. 62–64, May 1950.

DONALD E. CZAJA, Primary Examiner

M. I. MARQUIS, Assistant Examiner

U.S. Cl. X.R.

8—116.2; 106—165; 109—193, 200; 128—296; 260—17